United States Patent [19]
Luffel et al.

[11] Patent Number: 5,544,146
[45] Date of Patent: Aug. 6, 1996

[54] CARTRIDGE HANDLING SYSTEM

[75] Inventors: Robert W. Luffel, Greeley; D. Scott Paul, Ft. Collins; Jon D. Rugg, Greeley, all of Colo.

[73] Assignee: Hewlett-Packard Company, Palo Alto, Calif.

[21] Appl. No.: 296,054

[22] Filed: Aug. 24, 1994

[51] Int. Cl.⁶ ............................................. G11B 17/12
[52] U.S. Cl. .......................................... 369/178; 369/36
[58] Field of Search ............................. 369/178, 34, 36, 369/191, 192; 360/92

[56] References Cited

U.S. PATENT DOCUMENTS

| | | | |
|---|---|---|---|
| 4,837,647 | 6/1989 | Nonaka et al. | 360/92 |
| 4,944,082 | 7/1990 | Jones et al. | 29/467 |
| 4,998,232 | 3/1991 | Methlie et al. | 369/36 |
| 5,001,582 | 3/1991 | Numasaki | 360/92 |
| 5,010,536 | 4/1991 | Wanger et al. | 369/36 |
| 5,014,255 | 5/1991 | Wanger et al. | 369/36 |
| 5,036,503 | 7/1991 | Tomita | 360/92 |
| 5,043,962 | 8/1991 | Wanger et al. | 369/36 |
| 5,062,093 | 10/1991 | Christie et al. | 369/36 |
| 5,101,387 | 3/1992 | Wanger et al. | 369/36 |
| 5,184,336 | 2/1993 | Wanger et al. | 369/34 |

FOREIGN PATENT DOCUMENTS

8502051  5/1985  United Kingdom ............ 360/92

*Primary Examiner*—John H. Wolff
*Assistant Examiner*—William R. Korzuch

[57] ABSTRACT

The picker to cartridge slot referencing system may comprise a cartridge storage rack having a plurality of cartridge storage locations aligned along a cartridge storage axis. Each of the plurality of cartridge storage locations is adapted to receive a cartridge having an access end such that the access ends of cartridges, when positioned in the plurality of cartridge storage locations, are aligned along a cartridge access plane. An elongate lateral guide rail is mounted in parallel, spaced-apart relation to the cartridge storage axis and is positioned at about the cartridge access plane. A cartridge engaging assembly adapted to releasably engage the cartridges is slidably mounted to the elongate lateral guide rail, which guides the cartridge engaging assembly along a displacement path that is substantially parallel to the cartridge storage axis. An actuator connected to the cartridge engaging assembly positions the cartridge engaging assembly at predetermined points along the cartridge location axis.

18 Claims, 4 Drawing Sheets

CARTRIDGE HANDLING SYSTEM

BACKGROUND

This invention relates generally to systems for handling and storing media cartridges such as optical disk or tape cartridges and, more particularly, to a cartridge engaging assembly having improved guidance and positional accuracy.

An optical disk is a data storage medium which is readable by a laser-based reading device. Optical disks known as "compact disks" or "CDs" have become increasingly popular during the last decade for recording music and audio-visual works. Due to the large storage capacity of optical disks as compared to conventional magnetic storage media, optical disks known as "ROM disks" have become popular for storing computer readable information. However, until very recently, optical disks were of somewhat limited use in the computer industry due to the fact that optical disks could not be erased and written with new information, i.e., ROM disks are "read only" memory devices. However, recent technology has produced optical disks which are both computer readable and computer writable. Consequently, optical disks are becoming increasingly important in the computer industry and may eventually replace magnetically readable and writable storage media such as floppy disks and hard disks. Another recent development, the ability to provide data storage on both surfaces on an optical disk, has effectively doubled the storage capacity of the optical disk. Optical disks of the type used in computer applications are generally mounted in parallelepiped-shaped cartridges. Also used in the computer industry for data storage are parallelepiped-shaped tape cartridges such as Digital Audio Tape (DAT) cartridges and 8 mm tape cartridges.

The increasing popularity of such data storage cartridges in the computer field has spurred the development of many different types of automated cartridge handling systems for storing the cartridges at known locations and for retrieving a desired cartridge from a storage location and inserting the cartridge into a cartridge reading device, such as a tape or disk drive. Generally speaking, such a cartridge handling system may include a cartridge storage system for storing the cartridges at corresponding storage locations and a cartridge engaging assembly for retrieving a desired cartridge from its corresponding storage location, transporting the cartridge to a cartridge reading device, such as a disk or tape drive, and inserting the cartridge into the drive. The cartridge engaging assembly may also remove a cartridge from a drive, move the cartridge into alignment with its storage location, and return the cartridge to its storage location.

Various features and components of cartridge handling systems and cartridge engaging assemblies are disclosed in U.S. Pat. Nos. 4,944,082 for METHOD OF PROVIDING A SHEET METAL HOUSING WITH PRECISELY POSITIONED MOUNTING REFERENCES of Jones et al.; 4,998,232 for OPTICAL DISK HANDLING APPARATUS WITH FLIP LATCH of Methlie et al.; 5,014,255 for OPTICAL DISK CARTRIDGE HANDLING APPARATUS WITH PASSIVE CARTRIDGE ENGAGEMENT ASSEMBLY of Wanger, et al.; 5,010,536 for CARTRIDGE HANDLING SYSTEM of Wanger et al.; 5,043,962 for CARTRIDGE HANDLING SYSTEM of Wanger, et al.; 5,062,093 for OPTICAL DISK INSERTION APPARATUS of Christie, et al.; 5,101,387 for LATERAL DISPLACEMENT CONTROL ASSEMBLY FOR AN OPTICAL DISK HANDLING SYSTEM of Wanger, et al.; 5,184,336 for LATERAL DISPLACEMENT CONTROL ASSEMBLY FOR AN OPTICAL DISK HANDLING SYSTEM of Wanger, et al.; U.S. patent application Ser. Nos. 08/020,160 filed Feb. 18, 1993 for LATERAL DISPLACEMENT AND SUPPORT APPARATUS FOR USE IN A CARTRIDGE HANDLING SYSTEM of Luffel, et al.; and 08/135,607 filed Oct. 12, 1993 for CARTRIDGE HANDLING SYSTEM WITH DUAL CARTRIDGE ENGAGING ASSEMBLY, which are each hereby specifically incorporated by reference for all that is disclosed therein.

Many cartridge handling systems of the type described above store the cartridges in a two-dimensional array consisting of one or more vertical columns and horizontal rows. One or more disk or tape drives for the cartridges may be located anywhere in the array, but are usually positioned at the ends of the columns or rows. In any event, such a cartridge handling system will include apparatus for moving the cartridge engaging assembly throughout the array, so that the stored cartridges can be accessed and transported to and from the appropriate disk or tape drive.

While cartridge handling systems of the type described above provide a convenient means for automatically accessing a large number of cartridges, they are not without their problems. For example, a key factor in the successful operation of such a cartridge handling system is the ability to quickly and accurately move the cartridge engaging assembly throughout the array, engage a desired cartridge, and move it quickly to the appropriate cartridge reading device. Generally speaking, the apparatus for so moving the cartridge engaging assembly tends to be complex, and may include a large number of drive motors and position sensors to accomplish the desired functions. As with any mechanical system, however, such increased complexity often means decreased reliability. Therefore, it is desirable to minimize the number of components in such a system, but without sacrificing other performance parameters, such as speed and accuracy.

Another problem with such cartridge handling systems relates to the support and accurate positioning of the cartridge engaging assembly with respect to the cartridges stored in the array. For example, many cartridge engaging assemblies are cantilevered on a leadscrew, which when turned, moves the cartridge assembly across the array of cartridges. Unfortunately, such a cantilevered mounting arrangement tends to allow excessive transverse or rotational movement of the cartridge engaging assembly, which reduces positional accuracy. One way to increase the stability of the cartridge engaging assembly, thus positional accuracy, is to use rigid guide rails or tracks to provide additional support to the cartridge engaging assembly. Disadvantageously, many of the guide rail or track assemblies in use today are precision machined items, which adds to the overall cost of the cartridge handling system. Further, such guide rail assemblies are often difficult and time consuming to align. Worse yet, the guide rail assembly may be knocked out of alignment during subsequent shipping or movement of the cartridge handling device, thus requiring re-alignment and re-calibration before the device can be placed in operation.

Another problem relating to many cartridge handling systems is access speed, and efforts are constantly being made to minimize the mass of each component of the system, including the linear displacement and support apparatus for the cartridge engaging assembly, which tends to increase the speed at which the cartridge engaging assembly may be moved among the columns and rows of cartridges. Unfortunately, it is usually more difficult to achieve the desired degree of positional accuracy with a lighter weight system, and designers are constantly trying to find the optimum balance between light weight and positional accuracy. It is also desirable to minimize the volume requirements of the linear displacement and support apparatus so that it may be mounted in a relatively small space within the cartridge handling system.

Consequently, there remains a need for a cartridge handling system having increased positional accuracy to reduce errors due to misalignment of the cartridge engaging assembly. Such increased positional accuracy should be achieved with a minimum number of components to increase reliability, yet not require the use of expensive machined guide rails or tracks, which adds cost. Additional advantages could be realized by reducing the amount of time required to align and calibrate the assembly during production, and by reducing the likelihood of subsequent misalignment, such as may occur during shipping. Ideally, the above advantages should be accomplished without increasing the mass of the moving components, which tends to adversely affect access speed.

SUMMARY OF THE INVENTION

The picker to cartridge slot referencing system may comprise a cartridge storage rack having a plurality of cartridge storage locations aligned along a cartridge storage axis. Each of the plurality of cartridge storage locations is adapted to receive a cartridge having an access end such that the access ends of cartridges, when positioned in the plurality of cartridge storage locations, are aligned along a cartridge access plane. An elongate lateral guide rail is mounted in parallel, spaced-apart relation to the cartridge storage axis and is positioned at about the cartridge access plane. A cartridge engaging assembly adapted to releasably engage the cartridges is slidably mounted to the elongate lateral guide rail, which guides the cartridge engaging assembly along a displacement path that is substantially parallel to the cartridge storage axis. An actuator connected to the cartridge engaging assembly positions the cartridge engaging assembly at predetermined points along the cartridge location axis.

BRIEF DESCRIPTION OF THE DRAWING

Illustrative and presently preferred embodiments of the invention are shown in the accompanying drawing in which.

DETAILED DESCRIPTION OF THE INVENTION

Figure 1:
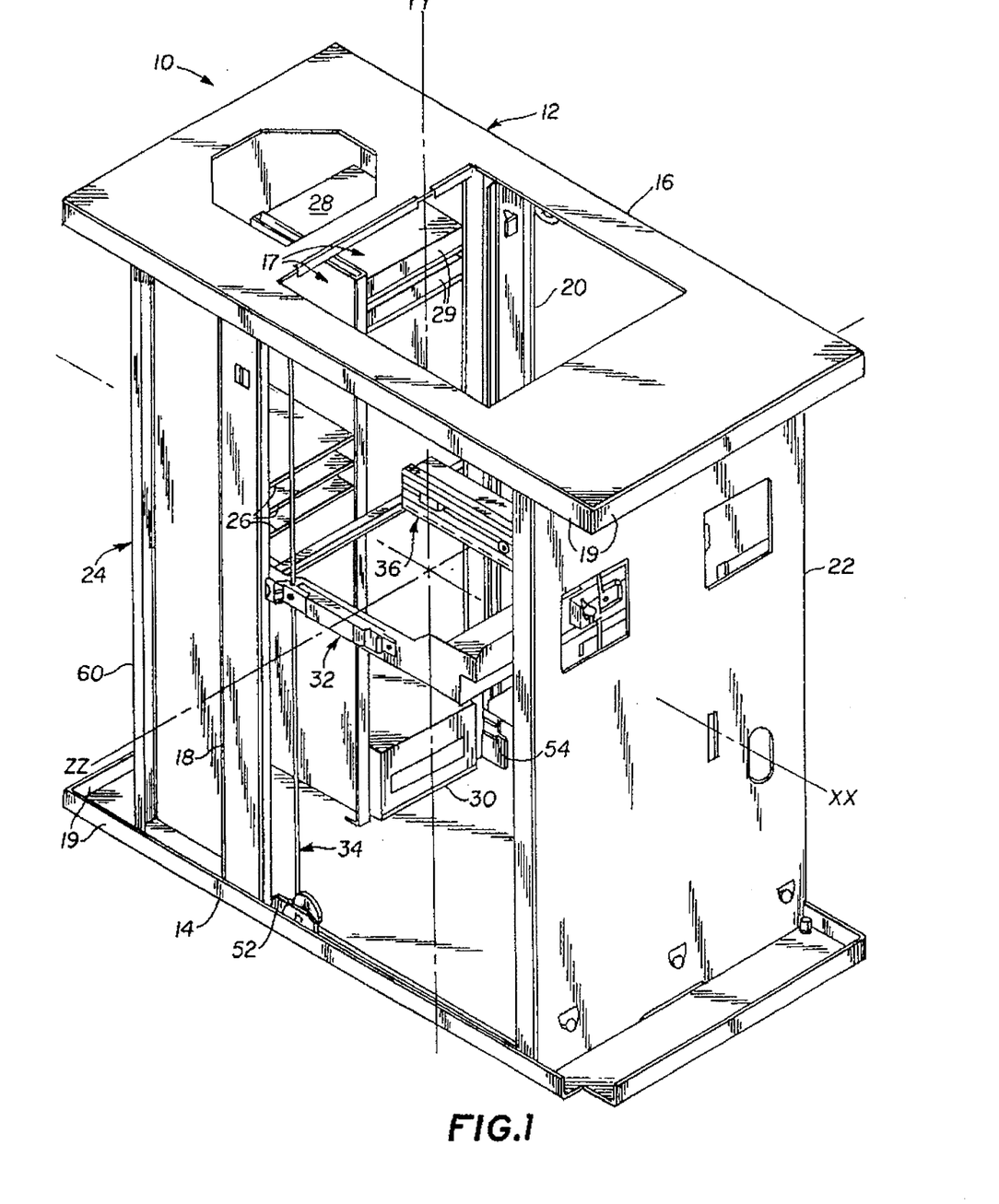
FIG. 1 is a perspective view of a cartridge handling system having the picker to cartridge slot referencing system according to the present invention.

A picker to cartridge slot referencing system 10 is shown in FIG. 1 as it could be used in a cartridge handling system 12 for storing and accessing a plurality of cartridges 28 stored in a plurality of vertical columns 17. More specifically, the cartridge handling system 12 may comprise a cartridge storage rack assembly 24 that is mounted between a base plate 14 and a top cover 16. The cartridge storage rack assembly 24 contains a plurality of cartridge storage locations or slots 26 arranged in two columns 17 that are adapted to slidably receive the cartridges 28. Thus arranged, the access ends 29 of cartridges 28 are aligned along a cartridge access plane 38, as best seen in FIG. 3. The cartridge storage rack assembly may also include first and second travel stops 52, 54 for providing an initial or reference position 27 (FIG. 2) for a cartridge engaging assembly 34, as will be described in greater detail below. Finally, the cartridge storage rack assembly 24 may also include space for one or more cartridge readers 30 capable of reading data from, or writing data to, the storage media within the cartridges 28.

The cartridge handling system 12 may also include a first guide rail 18 and a second guide rail 20 that are mounted to the base plate 14 and top cover 16 and substantially parallel to the cartridge access plane 38. A third or lateral guide rail 66 (FIG. 3) may also be mounted between the top cover 16 and base plate 14, or may be integral to the cartridge storage rack assembly 24. A vertical end panel 22 may also mounted to the base plate 14 and top cover 16 to provide support for the various components of the actuator assembly 34, as will be described in greater detail below.

The cartridge engaging assembly 32 is slidably mounted to the first and second guide rails 18 and 20, as well as to the lateral guide rail 66 (FIG. 3), so that it can be moved up and down (i.e., along the YY direction) by a suitable actuator assembly 34. The first and second guide rails 18 and 20 guide the cartridge engaging assembly 32 along the vertical (YY) direction, so that it moves substantially parallel to the cartridge access plane 38. The third or lateral guide rail 66 provides lateral guidance to the cartridge engaging assembly 32 as it moves in the vertical (YY) direction, thus allowing the cartridge engaging assembly 32 to accurately follow the vertical columns 17 of cartridges 28.

Significantly, the arrangement of the three guide rails 18, 20, and 66 is such that each individual guide rail need only be aligned with respect to two axes (or directions) in three dimensional space. Put another way, each guide rail need only be aligned with the cartridge storage axis such that it is contained within a plane that is substantially parallel to a plane containing the cartridge storage axis. In the embodiments shown and described herein, the first and second guide rails 18 and 20 are aligned so that they are contained within a bearing plane 31 that is substantially parallel to the YY–ZZ plane, whereas the lateral guide rail 66 is aligned so that it is contained within a plane perpendicular to the bearing plane 31, i.e., a plane parallel to the XX–YY plane. The intersection of these two planes defines a line or axis that is, by definition, parallel to the cartridge storage axis. Thus, the cartridge engaging assembly 32 is guided along a displacement path that is substantially parallel to the cartridge storage axis, all without the need for any single one of the guide rails to be precisely aligned with the cartridge storage axis, such as axis 56.

The cartridge engaging assembly 32 also includes a robotic picker assembly 36 that is mounted to support frame 72. In one preferred embodiment, the robotic picker assembly 36 is slidably mounted to the support frame 72 so it can be translated back and forth in the lateral (i.e., ZZ) direction by a suitable robotic picker actuator (not shown) to access cartridges 28 stored in either of the vertical columns 17. Consequently, the range of travel of the cartridge engaging assembly 32 is such that the robotic picker assembly 36 can access all of the cartridges 28 stored within the cartridge storage rack 24, as well as the cartridge reader 30.

Figure 2:
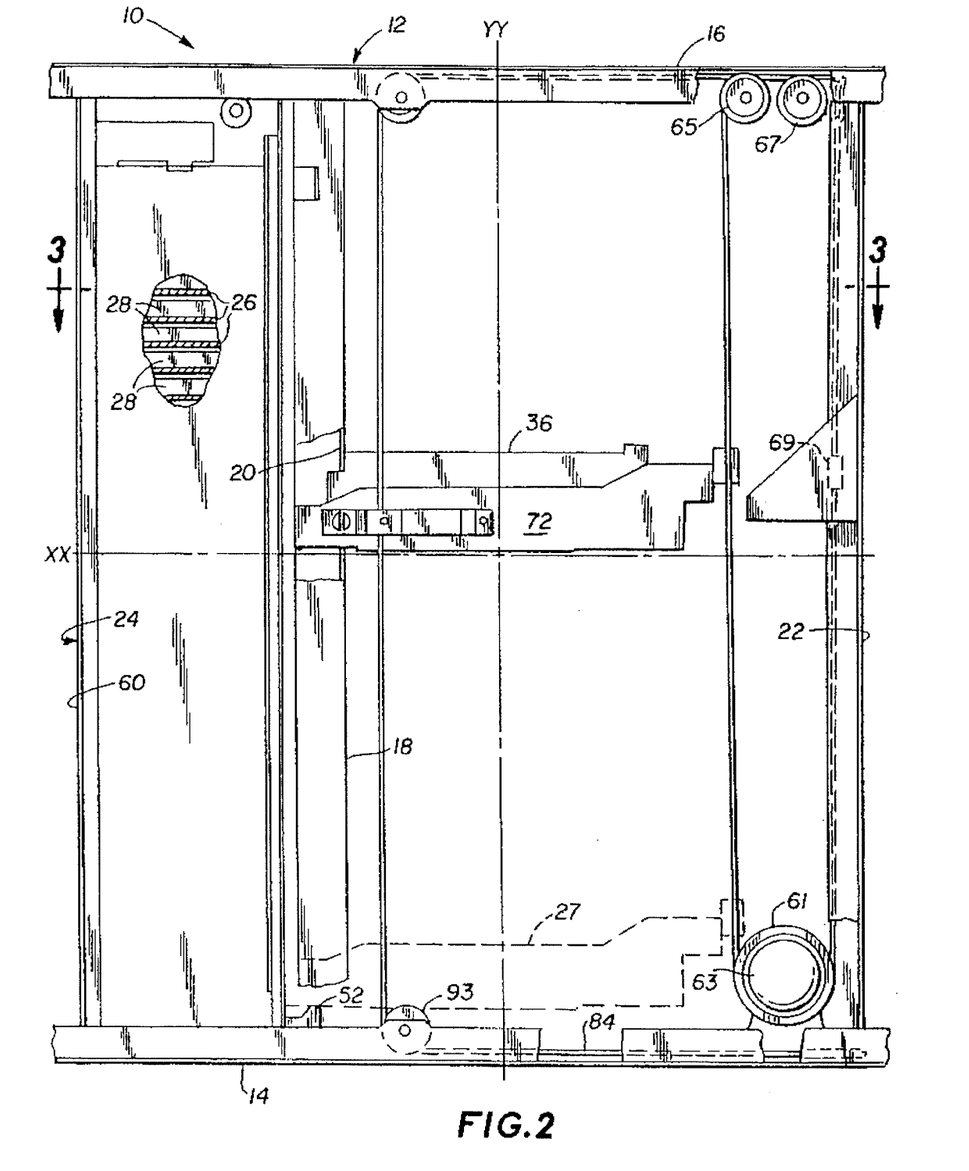
FIG. 2 is a side view in elevation of the cartridge handling system shown in FIG. 1 with portions of the frame assembly broken away to show various structural features.
Figure 3:
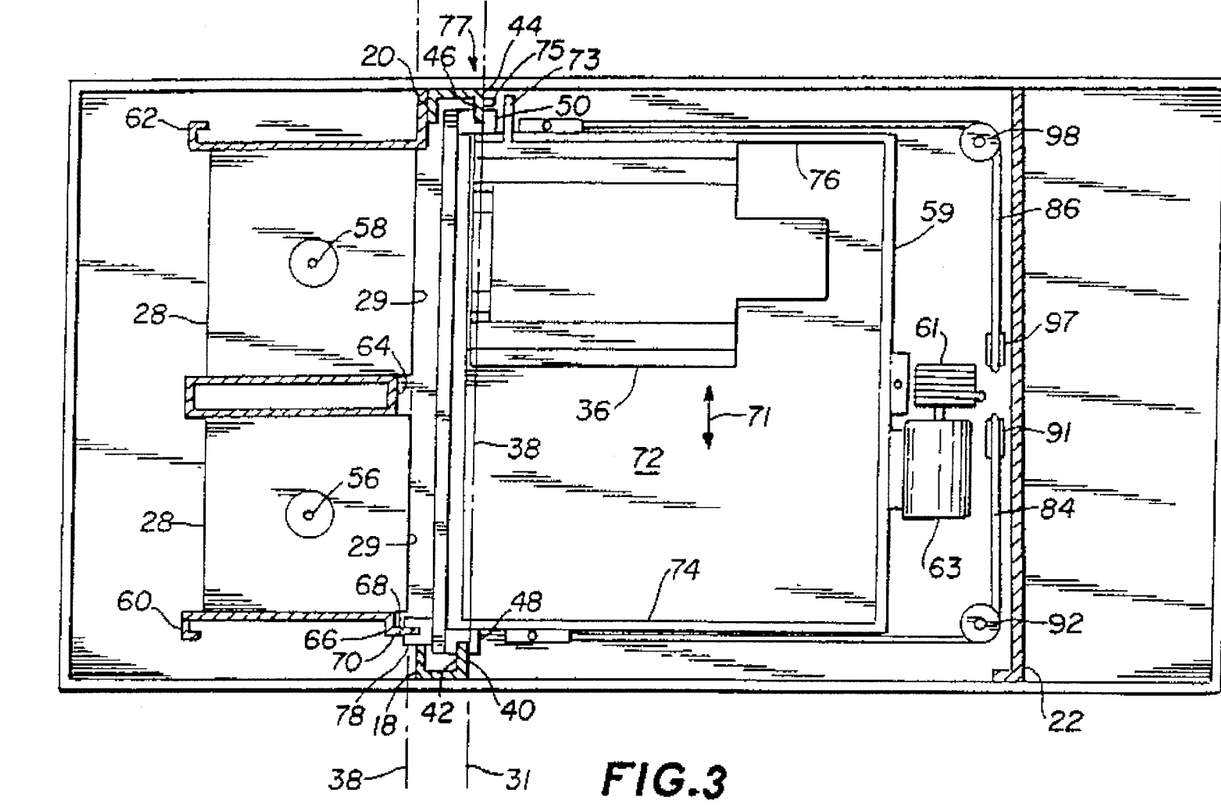
FIG. 3 is a cross-section view of the cartridge handling system taken along the line 3—3 of FIG. 2.

The cartridge engaging assembly 32 may also include a position encoder assembly 77 (FIG. 3) for determining the vertical position of the cartridge engaging assembly 32 with respect to a home or initial position 27 (shown in phantom in FIG. 2). More specifically; the position encoder assembly 77 includes an encoder strip 75 mounted between the base plate 14 and top cover 16 and an optical sensor 73 mounted to the frame side 76, as best seen in FIG. 3.

The cartridge handling system 12 operates in a conventional manner in response to requests for data from a host computer system (not shown). For example, upon receiving a request from a host computer system (not shown) for data contained on a particular cartridge 28, the cartridge handling control system (not shown) would cause the actuator assembly 34 to move the cartridge engaging assembly 32 to the appropriate vertical location required to access the desired cartridge 28. The vertical location of the cartridge engaging assembly 32 is determined from the position encoder assembly 77. If required, the cartridge handling control system would also cause the cartridge picker actuator (also not shown) to move the robotic picker assembly 36 along the support frame 72 to align it with the column 17 that contains the desired cartridge 28. The robotic picker assembly 36 would then be actuated to engage the desired cartridge 28 and retract the engaged cartridge into the picker assembly 36. The cartridge handling control system (not shown) would then cause the actuator assembly 34 to move the cartridge engaging assembly 32 as needed to align the robotic picker assembly 36 with the cartridge reader 30, at which point the robotic picker assembly would be actuated to insert the previously retrieved cartridge 28 into the cartridge reader 30.

A significant advantage of the picker to cartridge slot referencing system 10 is that the guide, support, and position reference points for both the cartridge storage rack 24 and the moveable cartridge engaging assembly 32 are positioned in close proximity to the cartridge access plane 38, thus significantly reducing positioning errors due to minor misalignments of the guide rails or other support components. In the case of the lateral guide rail 66, which is integral to the cartridge storage rack assembly 24, the guide and support references are derived directly from a structural element that is common to both the cartridge storage rack 24 and the cartridge engaging assembly 32. The close placement of the first and second guide rails 18 and 20 to the cartridge access plane 38 allows the cartridge engaging assembly 32 to accurately track the cartridge access plane 38 as it is moved up and down (i.e., in the YY direction) by the actuator assembly 34. The third or lateral guide rail 66 provides lateral (ZZ direction) guidance to the cartridge engaging assembly 34, thus allowing it to accurately track the vertical columns 17. Indeed, since the third or lateral guide rail 66 is integral to the cartridge storage rack assembly 24, the cartridge engaging assembly 32 will accurately track the vertical columns 17 of cartridges 28, even though they may not be precisely aligned with, or parallel to, the guide rails 18, 20, or other components of the cartridge handling system 12.

Another advantage of the present invention is that the increased positional accuracy has been achieved without the need to resort to expensive, precision machined components. Indeed, the fact that the guide rails 18, 20, and 66 may be fabricated from relatively light gauge sheet metal represents a significant improvement in that they are substantially easier and less expensive to fabricate. The structure is also much easier to align and calibrate during production and is less likely to become mis-aligned during subsequent shipping or handling. Vertical positioning errors are also substantially reduced, since the encoder assembly 77 derives the vertical position of the cartridge engaging assembly 32 with respect to the home or initial position 27 that is established by the travel stops 52 and 54 that are integral to the cartridge storage rack assembly 24.

The details of the picker to cartridge slot referencing system 10 are best seen by referring to FIGS. 1, 2, and 3 simultaneously. As was described above, the cartridge handling system 12 may comprise a base plate 14 and a top cover 16 that are used to define the relative positioning of the cartridge storage rack assembly 24, first and second guide rails 18 and 20, as well as vertical end panel 22. The base plate 14 and top cover 16 may be made from relatively light gauge sheet metal and manufactured according to U.S. Pat. No. 4,944,082 for METHOD OF PROVIDING A SHEET METAL HOUSING WITH PRECISELY POSITIONED MOUNTING REFERENCES, which was incorporated by reference above. Thus manufactured, the base plate 14 and top cover 16 will provide precisely positioned mounting references for the various components mounted thereto. Base plate 14 and top cover 16 may include optional flanges 19 for increased strength and rigidity. The vertical end panel 22 may also be made from relatively light gauge sheet metal and may also include flanges 19.

The cartridge storage rack assembly 24 can be any convenient structure adapted to hold and releasably engage the cartridges 28 and may be fastened to appropriate mounting points, such as slots or tabs (not shown), in base plate 14 and top cover 16 by any convenient means, such as by spot welding, rivets, screws, etc. In one preferred embodiment, the cartridge storage rack assembly 24 may comprise a plurality of cartridge storage locations 26 arranged in two columns 17, so that the cartridges 28 stored in each column 17 are aligned along respective cartridge storage axes 56 and 58 and so that the access ends 29 are also aligned along the cartridge access plane 38, as best seen in FIG. 3. The columns 17 are formed by first and second side members 60 and 62 and a center divider member 64 that are all fastened to the base plate 14 and top cover 16 in the relative positions shown in FIG. 3. Alternatively, the center divider member 64 may be otherwise secured to the first and second side members 60 and 62.

The first side member 60 also includes an integral lateral guide rail 66 having and opposed pair of bearing surfaces that comprise an inner bearing surface 68 and an opposed outer bearing surface 70. The bearing surfaces 68 and 70 are substantially perpendicular to the cartridge access plane 38. In one preferred embodiment, the first and second side members 60 and 62, as well as the center divider member 64 are manufactured from relatively light gauge sheet metal, although other materials could be used as well.

Each guide rail 18, 20 may also be made from relatively light gauge sheet metal and formed as an elongate member having a U-shaped cross section, as best seen in FIG. 3. One of the "legs" of each U-shaped guide rail 18 and 20 forms an opposed pair of elongate bearing surfaces that are substantially parallel to the cartridge access plane 38. More specifically, one such "leg" of the first guide rail 18 comprises an outer bearing surface 40 and an opposed inner bearing surface 42. Likewise, one such "leg" of the second guide rail 20 comprises an outer bearing surface 44 and an opposed inner bearing surface 46.

The guide rails 18 and 20 may be fastened to appropriate mounting points, such as slots or tabs (not shown), in base plate 14 and top cover 16 by any convenient means, such as by spot welding, rivets, screws, etc. Since the first and second guide rails 18 and 20 are fastened directly to the base plate 14 and top cover 16, which also precisely locates the first and second side members 60 and 62 of cartridge storage rack assembly 24, the first and second guide rails 18 and 20 will be substantially parallel to the cartridge storage axes 56, 58 as well as to the cartridge access plane 38. So positioned, the outer bearing surfaces 40, 44 of respective guide rails 18, 20 define a bearing plane 31 that is substantially parallel to the cartridge access plane 38, as best seen in FIG. 3.

While the guide rails 18, 20, and 66 may be made from relatively light gauge sheet metal, as described above, they could also be precision machined components. Further, while the third or lateral guide rail 66 is shown and described herein as an integral component of the first side member 60, it could also be integral to the second side member 62, or may even comprise a separate component. Another alternative would be to make the third or lateral guide rail integral to either the first or second guide rails 18 or 20. Still another alternative for integrating the functions of the third or lateral guide rails with either of the first or second guide rails would be to use an elongate cylindrical rod. In any event, it is preferred that the first, second, and third guide rails 18, 20, and 66 be positioned as close as possible to the cartridge access plane 38 to minimize position errors due to minor misalignments of the various components of the cartridge handling system 12.

Referring now to FIG. 3, the cartridge engaging assembly 32 may comprise a frame assembly 72 adapted to support the desired cartridge picker assembly 36. In one preferred embodiment, the cartridge engaging assembly 32 and the picker assembly 36 may be of the type disclosed in U.S. patent application Ser. No. 08/135,607, entitled CARTRIDGE HANDLING SYSTEM WITH DUAL CARTRIDGE ENGAGING ASSEMBLY, and incorporated by reference above, although other picker apparatus could be used. However, regardless of the type of picker assembly 36 used to capture and release the cartridges 28, the frame assembly 72 of cartridge engaging assembly 32 includes a pair of sliding bearings 48, 50 mounted to the first and second frame sides 74, 76, so that they engage the respective outer and inner bearing surfaces 40 and 42 of the first guide rail 18, and the respective outer and inner bearing surfaces 44, 46 of the second guide rail 20. The sliding bearings 48, 50 thus prevent the frame assembly from moving in the XX direction, but allow it to be moved up and down along the YY direction, substantially in alignment with the cartridge access plane 38. A third sliding bearing 78 mounted to the front 80 of frame 72 engages the opposed bearing surfaces 68 and 70 of the lateral guide rail 66 which guides the frame assembly 72 along the vertical columns 17 of cartridges 28. The three bearings 48, 50, and 78, thus allow the frame assembly 72 to accurately track the cartridges 28 stored in the cartridge storage rack assembly 24. In one preferred embodiment, the bearings 48, 50, and 78 may comprise Delrin® with Teflon® added as a lubricant, although other materials capable of providing a durable, low friction engagement with the bearing surfaces, such nylon, polycarbonate, or Teflon®, or even linear roller bearings, may be used as well.

A position encoder assembly 77 (FIG. 3) may comprise a position indexing means, such as an encoder strip 75 having a plurality of index marks (not shown) that is mounted between the base plate 14 and top cover 16, as shown in FIG. 3. An optical sensor 73 mounted to the frame side 76 of cartridge engaging assembly 32 detects the index marks (not shown) on the encoder strip 75, which allows the control system (not shown) to determine the vertical position of the cartridge engaging assembly 32. While the position of the encoder strip 75 is not particularly critical to the operation of the invention, it is preferred that the encoder strip 75 be positioned as close as possible to the cartridge access plane 38 to minimize position errors that may result from mechanical flexing of the cartridge frame 72 or other components of the system. For example, the encoder strip 75 could be mounted directly to the second guide rail 20, instead.

In one preferred embodiment, the control system (not shown) may periodically calibrate the position encoder assembly 77 by lowering the cartridge engaging assembly 32 so that it is seated on the travel stops 52 and 54, thereby establishing a home or initial position 27. The control system would then "zero" the position encoder assembly 77 while the cartridge engaging assembly 32 is at the initial position 27. Subsequent determinations of the vertical position of the cartridge engaging assembly 32 would then be made by counting the number of pulses received from the optical sensor 73 since moving from the initial position 27.

While the cartridge engaging assembly 32 may be moved along the YY direction by any convenient means, a number of which are known in the art, the cartridge engaging assembly 32 shown and described herein is actuated by a three-point cable support system of the kind disclosed in U.S. patent application Ser. No. 08/020,160 filed Feb. 18, 1993 for LATERAL DISPLACEMENT AND SUPPORT APPARATUS FOR USE IN A CARTRIDGE HANDLING SYSTEM of Luffel, et al., which was incorporated by reference above.

Figure 4:
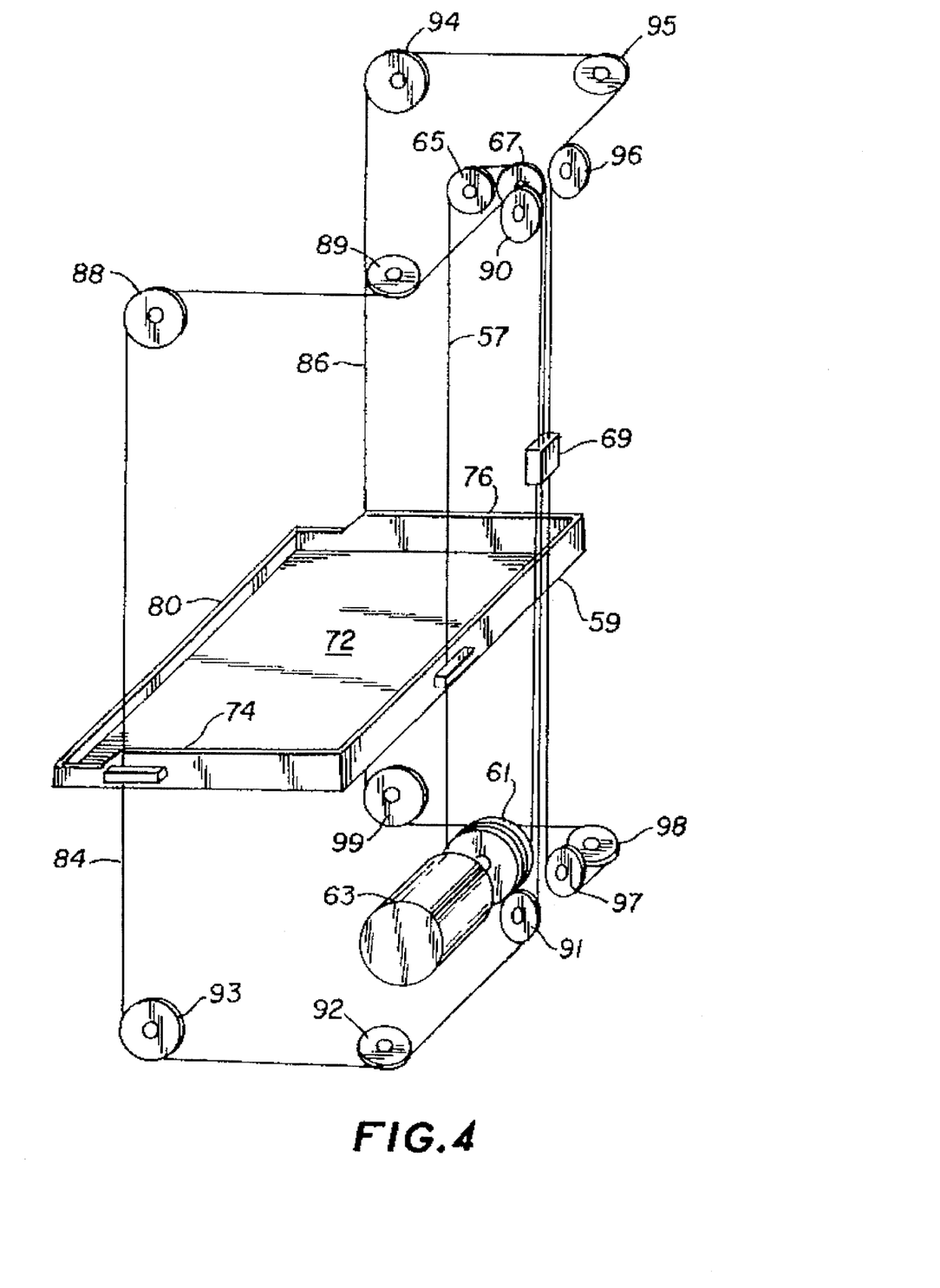
FIG. 4 is a schematic view in perspective of actuator assembly for moving the cartridge engaging assembly.

Briefly, the three point cable support and actuation system 82 is best seen in FIG. 4 and comprises a pair of endless support cables 84, 86 attached to the first and second side members 60, 62 of frame assembly 72. The first endless support cable 84 is guided over a plurality of pulley members 88, 89, 90, 91, 92, and 93, while the second endless support cable 86 is guided over pulley members 94, 95, 96, 97, 98, and 99. A drive cable 57 is attached to the rear end 59 of support frame 72 engages capstan 61 of drive motor assembly 63 at the lower end and a pair of pulleys 65, 67 at the upper end. A coupler 69 connects all three cables 57, 84, and 86, so that they move together, thus allowing for the uniform movement of the frame assembly 72 in the YY direction.

As was briefly described above, the cartridge handling system 12 may be controlled by a suitable control system (not shown) so that the cartridge engaging assembly 32 can be actuated to access various cartridges 28 and place them in the cartridge reader 30 in response to a request from a host computer (also not shown). For example, in response to a command from a host computer system to access data on a particular cartridge 28, the cartridge handling control system (not shown) will cause the actuator 34 to actuate the cartridge engaging assembly 32 to move it to the column and row that contains the desired cartridge; the vertical position of the cartridge engaging assembly 32 being determined by reference to the position encoder assembly 77. If the picker assembly 36 is not aligned with the proper column 17, the control system will also actuate the picker assembly translate mechanism (not shown) to move the picker assembly 36 to the other end of the cartridge engaging assembly 32 so that it can access the proper column. The control system may then actuate picker assembly 36 to engage and retrieve the desired cartridge. Finally, the control system will then actuate the cartridge engaging assembly 32 and picker assembly 36 as needed to insert the cartridge into the appropriate cartridge reader 30.

It is contemplated that the inventive concepts herein described may be variously otherwise embodied and it is intended that the appended claims be construed to include alternative embodiments of the invention except insofar as limited by the prior art.

What is claimed is:

1. A cartridge handling system, comprising:

a cartridge storage rack having a plurality of cartridge storage locations aligned along a cartridge storage axis substantially parallel to a YY axis of an orthogonal XX, YY, ZZ coordinate system containing an XX axis, the YY axis and a ZZ axis, each of the plurality of cartridge storage locations being adapted to receive a cartridge having an access end such that the access ends of the cartridges, when positioned in the plurality of cartridge storage locations, are aligned along a cartridge access plane substantially parallel to a YY–ZZ plane, the YY–ZZ plane containing the YY axis and the ZZ axis of the orthogonal XX, YY, ZZ coordinate system, the cartridges being substantially located on one side of the cartridge access plane;

a first elongate guide rail positioned at about the cartridge access plane and substantially parallel to only the YY–ZZ plane;

a second elongate guide rail positioned at about the cartridge access plane and substantially parallel to only the YY–ZZ plane, said first and second elongate guide rails defining a bearing plane that is substantially parallel to the cartridge access plane;

an elongate lateral guide rail positioned at about the cartridge access plane and substantially parallel to only an XX–YY plane, the XX–YY plane containing the XX axis and the YY axis of the orthogonal XX, YY, ZZ coordinate system;

a cartridge engaging assembly for releasably engaging cartridges positioned in the cartridge storage locations, said cartridge engaging assembly including first and second bearings for slidably engaging said first and second elongate guide rails and a lateral guide rail bearing for slidably engaging said elongate lateral guide rail, wherein said first and second elongate guide rails allow said cartridge engaging assembly to be moved in a first direction that is substantially parallel to the YY–ZZ plane and wherein said elongate lateral guide rail allows said cartridge engaging assembly to be moved in a second direction that is substantially parallel to the XX–YY plane, wherein said first and second guide rails and said lateral guide rail together guide said cartridge engaging assembly along a displacement path that is substantially parallel to the cartridge storage axis; and an actuator connected to said cartridge engaging assembly for positioning said cartridge engaging assembly at predetermined points along the displacement path.

2. The cartridge handling system of claim 1, wherein said elongate lateral guide rail includes an opposed pair of elongate bearing surfaces that are substantially perpendicular to the cartridge access plane and wherein said lateral guide rail bearing engages the opposed pair of elongate bearing surfaces.

3. The cartridge handling system of claim 2, wherein said cartridge storage rack includes a first side panel and a second side panel, the cartridge storage locations being positioned between said first and second side panels.

4. The cartridge handling system of claim 3, wherein said first elongate guide rail includes a first opposed pair of elongate bearing surfaces that are substantially parallel to the cartridge access plane, wherein said second elongate guide rail includes a second opposed pair of elongate bearing surfaces that are substantially parallel to the cartridge access plane, and wherein said first and second bearings engage the respective first and second opposed pairs of elongate bearing surfaces.

5. The cartridge handling system of claim 4, wherein said elongate lateral guide rail is mounted to said cartridge storage rack.

6. The cartridge handling system of claim 5, wherein said elongate lateral guide rail is integral to said first side panel.

7. The cartridge handling system of claim 5, wherein said elongate lateral guide rail is integral to said second side panel.

8. The cartridge handling system of claim 5, wherein said first and second elongate guide rails are mounted to said cartridge storage rack.

9. The cartridge handling system of claim 8, wherein said first side panel includes a first travel stop positioned near one end and wherein said second side panel includes a second travel stop positioned near one end, the first and second travel stops being positioned at the same respective ends of the first and second side panels so that they are engagable with said cartridge engaging assembly to establish an initial reference position.

10. The cartridge handling system of claim 9, wherein said cartridge engaging assembly includes a position encoder assembly for determining the position of the cartridge engaging assembly with respect to the initial reference position.

11. The cartridge handling system of claim 10, wherein said position encoder assembly includes a position encoder strip mounted to said second guide rail, said position encoder strip having a plurality of index marks and a detector assembly mounted to said cartridge engaging assembly for detecting said index marks.

12. The cartridge handling system of claim 11, wherein said detector assembly comprises an optical sensor.

13. The cartridge handling system of claim 12, wherein said first and second elongate guide rails comprise U-shaped members.

14. The cartridge handling system of claim 13, wherein said actuator comprises:

a first flexible tension member attached to said cartridge engaging assembly at about said first bearing;

a second flexible tension member attached to said cartridge engaging assembly at about said second bearing;

a third flexible tension member attached to said cartridge engaging assembly;

a flexible tension member engagement assembly located remotely from said cartridge engaging assembly and fixedly positioned with respect to said first and second elongate guide rails for maintaining said first, second, and third flexible tension members in parallel relationship with said cartridge access plane; and a drive assembly operatively connected to at least one of either said first flexible tension member, said second flexible tension member, or said third flexible tension member for driving said connected flexible tension member to displace said cartridge engaging assembly along the displacement path.

15. The cartridge handling system of claim 14, wherein said flexible tension member engagement assembly comprises a plurality of pulleys.

16. A cartridge handling system, comprising:

a first elongate guide rail positioned substantially parallel to a YY–ZZ plane of an orthogonal XX, YY, ZZ coordinate system containing an XX axis, a YY axis, and a ZZ axis, the YY–ZZ plane containing the YY axis and the ZZ axis;

a second elongate guide rail positioned substantially parallel only to the YY–ZZ plane, said first and second elongate guide rails defining a bearing plane;

an elongate lateral guide rail positioned substantially parallel only to an XX–YY plane, the XX–YY plane containing the XX axis and the YY axis;

a cartridge storage rack having a plurality of cartridge storage locations aligned along a cartridge storage axis parallel to the YY axis, each of the plurality of cartridge storage locations being adapted to receive a cartridge having an access end such that the access ends of the cartridges, when they are positioned in the plurality of cartridge storage locations, are aligned along a cartridge access plane substantially parallel to the YY–ZZ plane and the bearing plane; and a cartridge engaging assembly for releasably engaging cartridges positioned in the cartridge storage locations, said cartridge engaging assembly including first and second bearings for slidably engaging said first and second elongate guide rails and a lateral guide rail bearing for slidably engaging said elongate lateral guide rail, wherein said first and second elongate guide rails restrain the cartridge engaging assembly to movement in a first direction that is substantially parallel to the YY–ZZ plane and wherein said elongate lateral guide rail restrains the cartridge engaging assembly to movement in a second direction that is substantially parallel to the XX–YY plane, wherein said first and second elongate guide rails and said elongate lateral guide rail together guide said cartridge engaging assembly along a displacement path that is substantially parallel to the cartridge storage axis.

17. A cartridge handling system, comprising:

a first elongate guide rail having a first opposed pair of elongate bearing surfaces positioned substantially parallel only to a YY–ZZ plane of an orthogonal XX, YY, ZZ coordinate system containing an XX axis, a YY axis, and a ZZ axis, the YY–ZZ plane containing the YY axis and the ZZ axis;

a second elongate guide rail having a second opposed pair of elongate bearing surfaces positioned substantially parallel only to the YY–ZZ plane, said second elongate guide rail being positioned in parallel, spaced-apart relation to said first elongate guide rail so that the respective first and second opposed pairs of elongate bearing surfaces define a bearing plane;

an elongate lateral guide rail having an opposed pair of elongate bearing surfaces that are positioned substantially parallel only to an XX–YY plane, the XX–YY plane containing the XX axis and the YY axis;

a cartridge storage rack having a plurality of cartridge storage locations aligned along a cartridge storage axis parallel to the YY axis, each of the plurality of cartridge storage locations being adapted to receive a cartridge having an access end such that the access ends of the cartridges, when they are positioned in the plurality of cartridge storage locations, are aligned along a cartridge access plane substantially parallel to the YY–ZZ plane and the bearing plane; and a cartridge engaging assembly for releasably engaging cartridges positioned in the cartridge storage locations, said cartridge engaging assembly including first and second bearings adapted to engage the respective first and second opposed pairs of elongate bearing surfaces of said first and second elongate guide rails and a lateral guide rail bearing adapted to engage the opposed pair of elongate bearing surfaces of said elongate lateral guide rail, wherein the respective first and second opposed pairs of elongate bearing surfaces of said first and second elongate guide rails restrain the cartridge engaging assembly to movement in a first direction that is substantially parallel to the YY–ZZ plane and wherein the opposed pair of elongate bearing surfaces of said elongate lateral guide rail restrain the cartridge engaging assembly to movement in a second direction that is substantially parallel to the XX–YY plane, wherein said first and second elongate guide rails and said elongate lateral guide rail together guide said cartridge engaging assembly along a displacement path that is substantially parallel to the cartridge storage axis.

18. The cartridge handling system of claim 17, wherein said first elongate guide rail, said second elongate guide rail, and said elongate lateral guide rail are mounted to said cartridge storage rack.

* * * * *

UNITED STATES PATENT AND TRADEMARK OFFICE
CERTIFICATE OF CORRECTION

PATENT NO. : 5,544,146
DATED : March 3, 1998
INVENTOR(S) : Robert W. Luffel, et al.

It is certified that error appears in the above-identified patent and that said Letters Patent is hereby corrected as shown below:

In the Claims:

Column 1,
Line 54, After "YY" insert "plane"; (PTO's error)

Column 2,
Line 5, "directions" should read "direction"; (PTO's error)

Column 4,
Line 32 & 33, delete –the second corner engages--; (PTO's error)

Signed and Sealed this

Seventeenth Day of July, 2001

Attest:

NICHOLAS P. GODICI
Attesting Officer    Acting Director of the United States Patent and Trademark Office

REEXAMINATION CERTIFICATE (3454th)
United States Patent [19]
Luffel et al.

[11] B1 5,544,146
[45] Certificate Issued Mar. 3, 1998

[54] CARTRIDGE HANDLING SYSTEM

[75] Inventors: Robert W. Luffel, Greeley; D. Scott Paul, Ft. Collins; Jon D. Rugg, Greeley, all of Colo.

[73] Assignee: Hewlett-Packard Company, Palo Alto, Calif.

Reexamination Request:
No. 90/004,454, Nov. 14, 1996

Reexamination Certificate for:
Patent No.: 5,544,146
Issued: Aug. 6, 1996
Appl. No.: 296,054
Filed: Aug. 24, 1994

[51] Int. Cl.$^6$ .................................................. G11B 17/12
[52] U.S. Cl. ..................................... 369/178; 369/36
[58] Field of Search ............................. 360/92; 369/36

[56] References Cited

U.S. PATENT DOCUMENTS

| | | | |
|---|---|---|---|
| 4,444,069 | 4/1984 | Dangschat | 369/269 X |
| 5,001,582 | 3/1991 | Numasaki | 360/92 X |
| 5,036,503 | 7/1991 | Tomita | 369/36 |
| 5,060,211 | 10/1991 | Blanding | 369/36 |
| 5,065,379 | 11/1991 | Smith et al. | 369/36 |

FOREIGN PATENT DOCUMENTS

| | | |
|---|---|---|
| 0285866 | 10/1988 | European Pat. Off. |
| 0558302 | 9/1993 | European Pat. Off. |
| 2267384 | 12/1993 | United Kingdom |

*Primary Examiner*—Stuart S. Levy

[57] ABSTRACT

The picker to cartridge slot referencing system may comprise a cartridge storage rack having a plurality of cartridge storage locations aligned along a cartridge storage axis. Each of the plurality of cartridge storage locations is adapted to receive a cartridge having an access end such that the access ends of cartridges, when positioned in the plurality of cartridge storage locations, are aligned along a cartridge access plane. An elongate lateral guide rail is mounted in parallel, spaced-apart relation to the cartridge storage axis and is positioned at about the cartridge access plane. A cartridge engaging assembly adapted to releasably engage the cartridges is slidaby mounted to the elongate lateral guide rail, which guides the cartridge engaging assembly along a displacement path that is substantially parallel to the cartridge storage axis. An actuator connected to the cartridge engaging assembly positions the cartridge engaging assembly at predetermined points along the cartridge location axis.

B1 5,544,146

REEXAMINATION CERTIFICATE ISSUED UNDER 35 U.S.C. 307

THE PATENT IS HEREBY AMENDED AS INDICATED BELOW.

Matter enclosed in heavy brackets [ ] appeared in the patent, but has been deleted and is no longer a part of the patent; matter printed in italics indicates additions made to the patent.

AS A RESULT OF REEXAMINATION, IT HAS BEEN DETERMINED THAT:

Claims 2 and 4 are cancelled.

Claims 1, 3, 5, 16 and 17 are determined to be patentable as amended.

Claims 6–15 and 18 dependent on an amended claim, are determined to be patentable.

New claim 19 is added and determined to be patentable.

1. A cartridge handling system, comprising:
  a cartridge storage rack having a plurality of cartridge storage locations aligned along a cartridge storage axis substantially parallel to a YY axis of an orthogonal XX, YY, ZZ coordinate system containing an XX axis, the YY axis, and a ZZ axis, each of the plurality of cartridge storage locations being adapted to receive a cartridge having an access end such that the access ends of the cartridges, when positioned in the plurality of cartridge storage locations, are aligned along a cartridge access plane substantially parallel to a YY–ZZ plane the YY–ZZ plane containing the YY axis and the ZZ axis of the orthogonal XX, YY, ZZ coordinate system, the cartridges being substantially located on one side of the cartridge access plane;
  a first elongate guide rail *having a first opposed pair of elongate bearing surfaces* positioned at about the cartridge access plane and substantially parallel to only the YY–ZZ plane;
  a second elongate guide rail *having a second opposed pair of elongate bearing surfaces* positioned at about the cartridge access plane and substantially parallel to only the YY–ZZ plane, said first and second elongate guide rails defining a bearing plane that is substantially parallel to the cartridge access plane;
  an elongate lateral guide rail *having an opposed pair of elongate bearing surfaces* positioned at about the cartridge access plane and substantially parallel to only an XX–YY, the XX–YY plane containing the XX axis and the YY axis of the orthogonal XX, YY, ZZ coordinate system;
  a cartridge engaging assembly for releasably engaging cartridges positioned in the cartridge storage locations, said cartridge engaging assembly including first and second bearings for slidably engaging *the respective first and second opposed pairs of elongate bearing surfaces of* said first and second elongate guide rails and a lateral guide rail bearing for slidably engaging *the opposed pair of elongate bearing surfaces of* said elongate lateral guide rail, wherein *the first and second opposed pairs of elongate bearing surfaces of* said first and second elongate guide rails allow said cartridge engaging assembly to be moved in a first direction that is substantially parallel to the YY–ZZ plane and wherein *the opposed pair of elongate bearing surfaces of* said elongate lateral guide rail allows said cartridge engaging assembly to be moved in a second directions that is substantially parallel to the XX–YY plane, wherein said first and second guide rails and said lateral guide rail together guide said cartridge engaging assembly along a displacement path that is substantially parallel to the cartridge storage axis; and
  an actuator connected to said cartridge engaging assembly for positioning said cartridge engaging assembly at predetermined points along the displacement path.

3. The cartridge handling system of claim [2] *1*, wherein said cartridge storage rack includes a first side panel and a second side panel, the cartridge storage locations being positioned between said first and second side panels.

5. The cartridge handling system of claim [4] *3*, wherein said elongate lateral guide rail is mounted to said cartridge storage rack.

16. A cartridge handling system, comprising:
  a first elongate guide rail *having a first opposed pair of elongate bearing surfaces* positioned substantially parallel to a YY–ZZ plane of an orthogonal XX, YY, ZZ coordinate system containing an XX axis, a YY axis, and a ZZ axis, the YY–ZZ plane containing the YY axis and the ZZ axis;
  a second elongate guide rail *having a second opposed pair of elongate bearing surfaces* positioned substantially parallel only to the YY-ZZ plane, said first and second elongate guide rails defining a bearing plane;
  an elongate lateral guide rail *having an opposed pair of elongate bearing surfaces* positioned substantially parallel only to an XX–YY plane, the XX–YY plane containing the XX axis and the YY axis;
  a cartridge storage rack having a plurality of cartridge storage locations aligned along a cartridge storage axis parallel to the YY axis, each of plurality of cartridge storage locations being adapted to receive a cartridge having an access end such that the access ends of the cartridges, when they are positioned in the plurality of cartridge storage locations, are aligned along a cartridge access plane substantially parallel to the YY–ZZ plane and the bearing plane; and
  a cartridge engaging assembly for releasably engaging cartridges positioned in the cartridge storage locations, said cartridge engaging assembly including first and second bearings for slidably engaging *the respective first and second opposed pairs of elongate bearing surfaces of* said first and second elongate guide rails and a lateral guide rail bearing for slidably engaging *the opposed pair of elongate bearing surfaces of* said elongate lateral guide rail, wherein *the first and second opposed pairs of elongate bearing surfaces of* said first and second elongate guide rails restrain the cartridge engaging assembly to movement in a first direction that is substantially parallel to the YY–ZZ plane and wherein *the opposed pair of elongate bearing surfaces of* said elongate lateral guide rail restrains the cartridge engaging assembly to movement in a second direction that is substantially parallel to the XX–YY, plane, wherein said first and second guide rails and said elongate lateral guide rail together guide said cartridge engaging assembly along a displacement path that is substantially parallel to the cartridge storage axis.

17. A cartridge handling system, comprising:

a first elongate guide rail having a first opposed pair of elongate bearing surfaces positioned substantially parallel only to a YY–ZZ plane of an orthogonal XX, YY, ZZ coordinate system containing an XX axis, a YY axis, and a ZZ axis, the YY–ZZ plane containing the YY axis and the ZZ axis;

a second elongate guide rail having a second opposed pair of elongate bearing surfaces positioned substantially parallel only to the YY–ZZ plane, said second elongate guide rail being positioned in parallel, spaced-apart relation to said first elongate guide rail so that the respective first and second opposed pairs of elongate bearing surfaces define a bearing plane;

an elongate lateral guide rail having an opposed pair of elongate bearing surfaces that are positioned substantially parallel only to an XX–YY plane, the XX–YY plane containing the XX axis and the YY axis;

a cartridge storage rack having a plurality of cartridge storage locations aligned along a cartridge storage axis parallel to the YY axis, each of the plurality of cartridge storage locations being adapted to receive a cartridge having an access end such that the access ends of the cartridges, when they are positioned in the plurality of cartridge storage locations, are aligned along a cartridge access plane substantially parallel to the YY–ZZ plane and the bearing plane; and a cartridge engaging assembly for releasably engaging cartridges positioned in the cartridge storage locations, said cartridge engaging assembly including first and second bearings adapted to *slidably* engage the respective first and second opposed pairs of elongate bearing surfaces of said first and second elongate guide rails and a lateral guide rail bearing adapted to *slidably* engage the opposed pair of elongate bearing surfaces of said elongate lateral guide rail, wherein the respective first and second opposed pairs of elongate bearing surfaces of said first and second elongate guide rails restrain the cartridge engaging assembly to movement in a first direction that is substantially parallel to the YY–ZZ plane and wherein the opposed pair of elongate bearing surfaces of said elongate lateral guide rail restrain the cartridge engaging assembly to movement in a second direction that is substantially parallel to the XX–YY plane, wherein said first and second elongate guide rails and said elongate lateral guide rail together guide said cartridge engaging assembly along a displacement path that is substantially parallel to the cartridge storage axis.

*19. The cartridge handling system of claim 1, wherein said cartridge engaging assembly comprises a generally rectangular frame member including a front portion and two opposed side portions, the front portion generally facing said cartridge storage rack, the front portion and a first of the two opposed side portions defining a first corner of said cartridge engaging assembly and the front portion and a second of the two opposed side portions defining a second corner of said cartridge engaging assembly, the first and second corners being located adjacent the cartridge access plane, and wherein the first and second bearings are positioned at about the first and second corners of said cartridge engaging assembly, respectively, and wherein the lateral guide rail bearing is positioned at about the second corner of said cartridge engaging assembly, so that only the first and second corners of said cartridge engaging assembly engage said first and second elongate guide rails and the second corner engages said elongate lateral guide rail.*

\* \* \* \* \*